(12) United States Patent
Wu et al.

(10) Patent No.: US 10,775,854 B2
(45) Date of Patent: Sep. 15, 2020

(54) METHOD FOR LIGHTING SCREEN OF SMART WRISTBAND BY RAISING HAND AND SMART WRISTBAND

(71) Applicant: GUANGDONG APPSCOMM CO., LTD., Guangzhou, Guangdong Province (CN)

(72) Inventors: Miaoyu Wu, Guangzhou (CN); Zhihui Yang, Guangzhou (CN); Guang Yang, Guangzhou (CN)

(73) Assignee: GUANGDONG APPSCOMM CO., LTD., Guangzhou (CN)

( * ) Notice: Subject to any disclaimer, the term of this patent is extended or adjusted under 35 U.S.C. 154(b) by 0 days.

(21) Appl. No.: 16/322,305

(22) PCT Filed: Nov. 16, 2016

(86) PCT No.: PCT/CN2016/105994
§ 371 (c)(1),
(2) Date: Jan. 31, 2019

(87) PCT Pub. No.: WO2018/023894
PCT Pub. Date: Feb. 8, 2018

(65) Prior Publication Data
US 2019/0187762 A1     Jun. 20, 2019

(30) Foreign Application Priority Data

Aug. 1, 2016   (CN) .......................... 2016 1 0615126
Sep. 9, 2016   (CN) .......................... 2016 1 0811543

(51) Int. Cl.
*G06F 1/16*     (2006.01)
*G06F 3/0346*     (2013.01)
*G06F 3/01*     (2006.01)

(52) U.S. Cl.
CPC .............. *G06F 1/1694* (2013.01); *G06F 1/16* (2013.01); *G06F 1/163* (2013.01); *G06F 3/017* (2013.01); *G06F 3/0346* (2013.01)

(58) Field of Classification Search
None
See application file for complete search history.

(56) References Cited

U.S. PATENT DOCUMENTS

2003/0176815 A1    9/2003   Baba et al.
2013/0090083 A1    4/2013   DeMont et al.
(Continued)

FOREIGN PATENT DOCUMENTS

CN     104238924 A    12/2014
CN     105357366 A    2/2016
(Continued)

OTHER PUBLICATIONS

International Search Report dated Jun. 13, 2017 from PCT Application No. PCT/CN2016/105994.

*Primary Examiner* — Joseph R Haley
(74) *Attorney, Agent, or Firm* — Innovation Capital Law Group, LLP; Vic Lin

(57) ABSTRACT

Disclosed is a method for lighting a screen of a smart wristband by raising the hand. The smart wristband includes at least a processor, a display screen, and a three-axis acceleration sensor. The method includes processing and analyzing acquired three-axis acceleration data, and determining a time period and an amplitude of acceleration data of each of an X-axis, a Y-axis and a Z-axis, thereby determining whether a user raises the hand. According to the method, the real thought of a user can be accurately determined, a screen is accurately lighted when the user raises the hand, and the state of a wristband worn on the left hand or
(Continued)

the right hand does not need to be reset when the user changes the left hand and the right hand.

11 Claims, 3 Drawing Sheets

(56) References Cited

U.S. PATENT DOCUMENTS

| | | | |
|---|---|---|---|
| 2015/0286285 A1* | 10/2015 | Pantelopoulos | G06F 3/017 345/156 |
| 2016/0018872 A1* | 1/2016 | Tu | G06F 3/017 345/173 |
| 2019/0053163 A1* | 2/2019 | Kashiwagi | G06F 1/1694 |

FOREIGN PATENT DOCUMENTS

| | | | |
|---|---|---|---|
| CN | 106037179 A | 10/2016 | |
| CN | 106227355 A | 12/2016 | |
| CN | 206006223 U | 3/2017 | |
| WO | 02099614 A1 | 12/2002 | |

* cited by examiner

METHOD FOR LIGHTING SCREEN OF SMART WRISTBAND BY RAISING HAND AND SMART WRISTBAND

TECHNICAL FIELD

The present invention relates to the field of controlling the screen lighting of a smart wristband, and particularly relates to a method for lighting a screen of a smart wristband by raising the hand.

BACKGROUND

At present, smart wristbands have been widely used in people's healthy lives, and are already in a trend to replace traditional wristwatches. Due to the small size of the smart wristband, the battery pack that can be placed is also small, and it is very urgent to minimize energy consumption during use. For a smart wristband with a larger display screen, when a user needs to check time, heart rate data or other functional data, the user needs to click on the screen by hand or press the button on the smart wristband by hand. When the user's other hand without wearing the wristband is in a state of being incapable of operating the smart wristband, the user obviously cannot simply light the screen to obtain the required information. Therefore, there is an urgent need for lighting a screen without the assistance of the other hand to meet the needs of the user. The conventional methods for the screen lighting of a wristband are generally implemented by detecting the flip angle of the wristband or using an altimeter to determine whether the user has a need to check time. However, this method is inaccurate. Sometimes the wristband is flipped several times and the screen is still not lighted, and sometimes a tiny motion may cause the screen to be always lighted. In addition, due to the habits of individual users, the smart wristband may be worn on either the left hand or the right hand. Every time a user changes the hand wearing the wristband, the user needs to set the hand wearing the wristband to be left or right, and then replace the algorithm for lighting the screen, depending on the left or right hand wearing the wristband.

The conventional methods for determining the screen lighting have the disadvantage of inaccurate determination and the disadvantage that it is necessary for the user to reset the state of the wristband worn on the left or right hand.

SUMMARY

The technical solutions of the present invention are as follows.

A method for lighting a screen of a smart wristband by raising the hand is disclosed, the smart wristband comprising at least a processor, a display screen, and a three-axis acceleration sensor. The method comprises the following steps:

step 1: the three-axis acceleration sensor acquires three-axis acceleration data of the smart wristband, and transmits the three-axis acceleration data to the processor;

step 2: the processor filters the acquired three-axis acceleration data to obtain processed three-axis acceleration data;

step 3: the processor stores a sampling frequency F, a first time period threshold $T_1/F$ (where F is the sampling frequency, $T_1<F$, and $T_1$ is an integer) and an amplitude threshold, and the processor counts a time period and an amplitude of acceleration data of each of the three axes continuously rising or falling; if time periods of acceleration data of an X-axis and a Y-axis (a plane defined by the X-axis and the Y-axis is a plane which is parallel to the display screen of the wristband) of the three axes continuously rising or falling reach the first time period threshold $T_1/F$ stored in the processor, and if amplitudes of acceleration data of the X-axis and the Y-axis continuously rising or falling reach the amplitude threshold stored in the processor, the processor determines that a hand raising identifier appears, and the process proceeds to step 4; and if not, step 3 is repeated;

step 4: the processor stores a second time period threshold $T_2/F$ (where F is the sampling frequency, $T_2<F$, and $T_2$ is an integer), an acceleration interval, and a number threshold; within the second time period threshold $T_2/F$, the processor samples $T_2$ acceleration data for each of the axes and counts a number value of acceleration data of each of the axes falling within the acceleration interval; if the number value of each of the axes reaches the number threshold, the processor determines that the hand is raised, and the process proceeds to step 5; if the number value of any of the axes does not reach the number threshold, step 3 is repeated; and step 5: the processor controls the lighting of the display screen.

Further, in step 3, the amplitude threshold comprises an X-axis amplitude threshold and a Y-axis amplitude threshold, and the processor counts a time period and an amplitude of acceleration data of each of the three axes continuously rising or falling; if time periods of acceleration data of the X-axis and the Y-axis of the three axes continuously rising or falling reach the first time period threshold $T_1/F$ stored in the processor, and if amplitudes of acceleration data of the X-axis and the Y-axis continuously rising or falling reach the amplitude threshold of the corresponding axis stored in the processor, the processor determines that the hand raising identifier appears, and the process proceeds to step 4; and if not, step 3 is repeated.

Further, in step 4, the acceleration interval comprises an X-axis acceleration interval $[a_1,b_1]$, a Y-axis acceleration interval $[a_2,b_2]$ and a Z-axis acceleration interval $[a_3,b_3]$, the number threshold comprises an X-axis number threshold, a Y-axis number threshold, and a Z-axis number threshold; within the second time period threshold $T_2/F$, the processor samples $T_2$ acceleration data for each of the axes and counts a number value of acceleration data of each of the axes falling within the acceleration interval of the corresponding axis; if the number value of acceleration data of each of the axes falling within the acceleration interval of the corresponding axis reaches the number threshold of the corresponding axis, the processor determines that the hand is raised, and the process proceeds to step 5; if the number value of acceleration data of any of the axes falling within the acceleration interval of the corresponding axis does not reach the number threshold of the corresponding axis, step 3 is repeated.

Further, in step 4, the $T_2$ acceleration data sampled for each of the axes represents an average sample within the second time period threshold $T_2/F$.

Further, a smart wristband for implementing the above method for lighting a screen of a smart wristband by raising the hand is also disclosed. The smart wristband comprises at least a processor, a display screen and a three-axis acceleration sensor; the processor comprises a storage module and a comparison module; the storage module stores the acceleration threshold, the sampling frequency, the first time period threshold $T_1/F$, the amplitude threshold, the second time period threshold $T_2/F$, the acceleration interval, and the number threshold; the processor is connected to the display screen and the three-axis acceleration sensor, and the comparison module implements the comparison calculation related to the "reach" in step 3 and step 4.

Alternatively, in step 3, intensity of a human body is determined first. Specifically, the processor stores a first acceleration threshold; if the acceleration data of at least one axis in the three-axis acceleration data reaches the first acceleration threshold, the processor determines that the human body is in a state of intense motion; and if not, the processor determines that the human body is in a state of non-intense motion. Thus, it is possible to make more accurate determination on situations of the human body.

According to the above technical solutions of the present invention, the real thought of a user can be accurately determined, a screen is accurately lighted when the user raises the hand, and the state of a wristband worn on the left or right hand does not need to be reset when the user changes the left hand and the right hand.

BRIEF DESCRIPTION OF THE DRAWINGS

The above and other objects, features and advantages of the present invention will become more apparent from the detailed description of the exemplary embodiments of the present invention by referring to the accompanying drawings.

DETAILED DESCRIPTION

Figure 1:
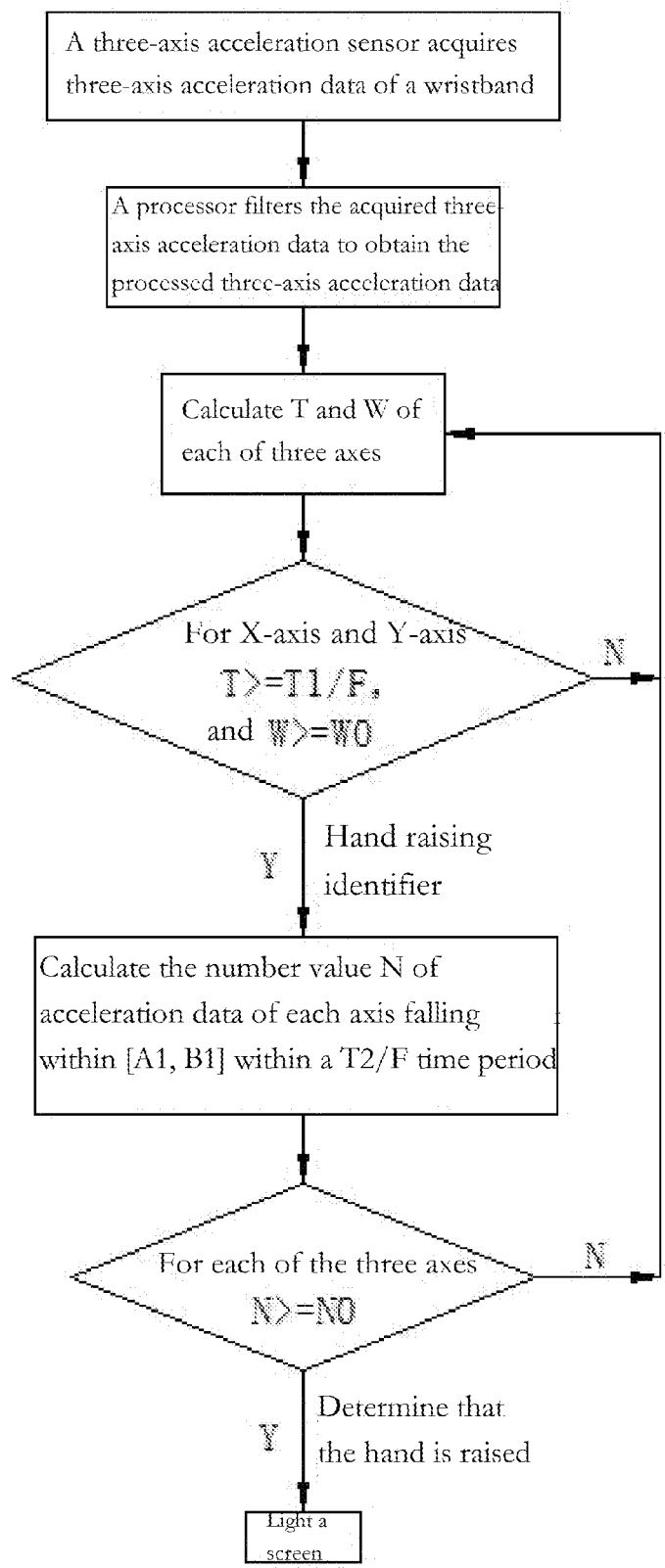
FIG. 1 is a flow chart showing an embodiment 1 of the present invention.

Exemplary embodiments will now be described more fully with reference to the accompanying drawings. The exemplary embodiments can, however, be embodied in a variety of forms and should not be construed as being limited to the examples set forth herein. Instead, these embodiments are provided so that the present invention will be thorough and complete, and the conception of the exemplary embodiments is fully conveyed to those skilled in the art. The accompanying drawings are only schematic representations of the present invention and are not necessarily to scale. The same reference numerals in the drawings denote the same or similar parts, and the repeated description thereof will be omitted.

Furthermore, the described features, structures, or characteristics may be combined in any suitable manner in one or more embodiments. In the following description, numerous specific details are provided to give a thorough understanding of embodiments of the present invention. However, those skilled in the art will appreciate that the technical solution of the present invention may be practiced, and one or more of the specific details may be omitted, or other methods, components, devices, steps, and the like may be employed. In other instances, well-known structures, methods, devices, implementations, or operations are not shown or described in detail to avoid obscuring aspects of the invention.

Embodiment 1

Figure 3:
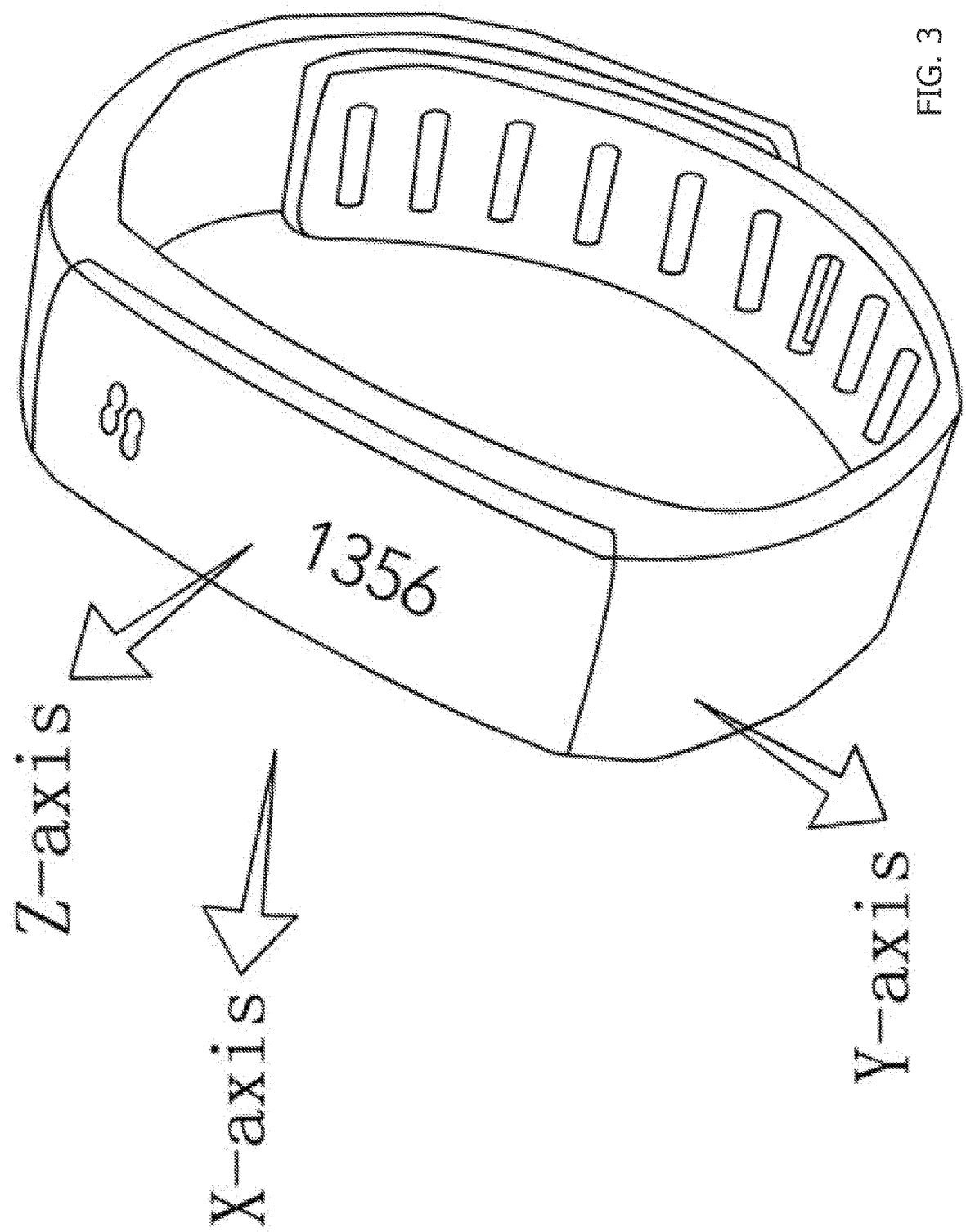
FIG. 3 is a schematic view of the smart wristband of the present invention.

As shown in FIG. 3, a smart wristband comprises at least a processor, a display screen, and a three-axis acceleration sensor. As shown in FIG. 1, a method for implementing the screen lighting by raising the hand comprises the following steps.

A method for lighting a screen of a smart wristband by raising the hand is disclosed, the smart wristband comprising at least a processor, a display screen, and a three-axis acceleration sensor. The method comprises the following steps.

In step 1: the three-axis acceleration sensor acquires three-axis acceleration data of the smart wristband, and transmits the three-axis acceleration data to the processor.

In step 2: the processor filters the acquired three-axis acceleration data to obtain processed three-axis acceleration data.

In step 3: the processor stores a sampling frequency F=32, a first time period threshold $T_1/F=6/32$ (where F is the sampling frequency, $T_1<F$, and $T_1$ is an integer) and an amplitude threshold W0, and the processor counts a time period and an amplitude of acceleration data of each of the three axes continuously rising or falling; if time periods of acceleration data of an X-axis and a Y-axis (a plane defined by the X-axis and the Y-axis is a plane which is parallel to the display screen of the wristband) of the three axes continuously rising or falling reach the first time period threshold $T_1/F=6/32$ stored in the processor, and if amplitudes of acceleration data of the X-axis and the Y-axis continuously rising or falling reach the amplitude threshold W0 stored in the processor, the processor determines that a hand raising identifier appears, and the process proceeds to step 4; and if not, step 3 is repeated.

In step 4: the processor stores a second time period threshold $T_2/F=12/32$ (where F is the sampling frequency, $T_2<F$, and $T_2$ is an integer), an acceleration interval [A1, B1], and a number threshold NO; within the second time period threshold $T_2/F=12/32$, the processor samples T2=12 acceleration data for each of the axes and counts number values N of acceleration data of each of the axes falling within the acceleration interval [A1, B1]; if the number values N of each of the axes reach the number threshold NO, the processor determines that the hand is raised, and the process proceeds to step 5; if the number value N of any of the axes does not reach the number threshold NO, step 3 is repeated.

In step 5: the processor controls the lighting of the display screen.

In step 3, the amplitude threshold comprises an X-axis amplitude threshold=20 and a Y-axis amplitude threshold=15, and the processor counts a time period T and an amplitude W of acceleration data of each of the three axes continuously rising or falling; if time periods of acceleration data of the X-axis and the Y-axis of the three axes continuously rising or falling reach the first time period threshold $T_1/F=6/32$ stored in the processor, and if amplitudes of acceleration data of the X-axis and the Y-axis continuously rising or falling reach the amplitude threshold of the corresponding axis stored in the processor, the processor determines that the hand raising identifier appears, and the process proceeds to step 4; and if not, step 3 is repeated.

Further, in step 4, the acceleration interval comprises an X-axis acceleration interval $[a_1, b_1]=[-30, 36]$, a Y-axis acceleration interval $[a_2, b_2]=[-80, 17]$ and a Z-axis acceleration interval $[a_3, b_3]=[-70, -8]$, the number threshold NO comprises an X-axis number threshold=10, a Y-axis number threshold=9, and a Z-axis number threshold=9; within the second time period threshold $T_2/F=12/32$, the processor samples $T_2=12$ acceleration data for each of the axes and counts a number value N of acceleration data of each of the axes falling within the acceleration interval [A1, B1] of the corresponding axis; if the number value N of acceleration data of each of the axes falling within the acceleration interval [A1, B1] of the corresponding axis reaches the number threshold of the corresponding axis, the processor determines that the hand is raised, and the process proceeds to step 5; if the number value N of acceleration data of any of the axes falling within the acceleration interval of the corresponding axis does not reach the number threshold NO of the corresponding axis, step 3 is repeated.

Further, in step 4, the $T_2$ acceleration data sampled for each of the axes represents an average sample within the second time period threshold $T2/F=12/32$.

Embodiment 2

Figure 2:
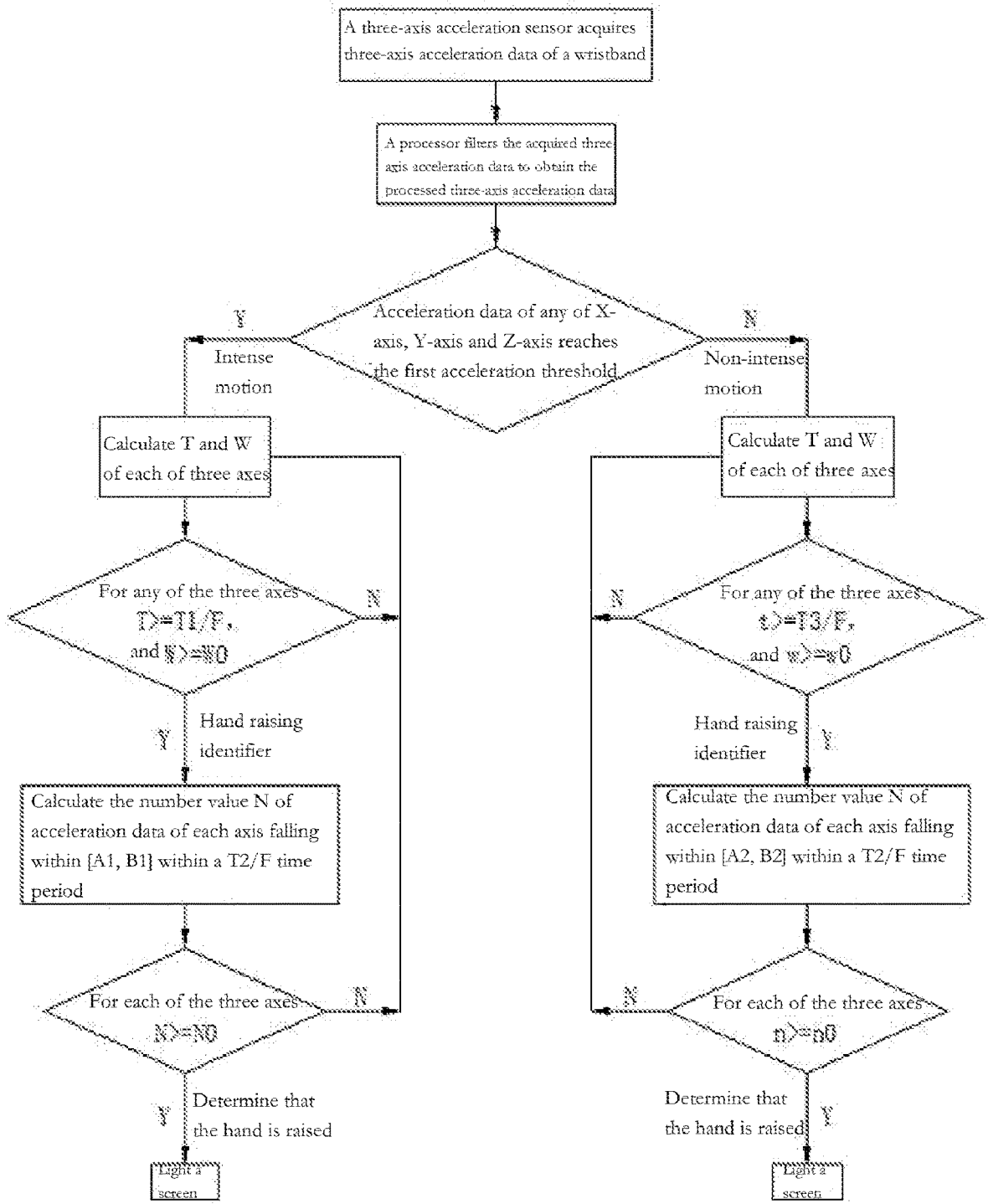
FIG. 2 is a flow chart showing an embodiment 2 of the present invention.

As shown in FIG. 3, a smart wristband comprises at least a processor, a display screen, and a three-axis acceleration sensor. As shown in FIG. 2, a method for implementing the screen lighting by raising the hand comprises the following steps.

In step 1: the three-axis acceleration sensor acquires three-axis acceleration data of the smart wristband, and transmits the three-axis acceleration data to the processor. The three axes are X, Y and Z axes, a plane formed by the X and Y axes is parallel to a plane of the display screen, and the Z axis is perpendicular to the plane formed by the X and Y axes.

In step 2: the processor filters the acquired three-axis acceleration data to obtain processed three-axis acceleration data.

In step 3: the processor stores a first acceleration threshold; if the acceleration data of at least one axis in the three-axis acceleration data reaches the first acceleration threshold=65, the processor determines that the human body is in a state of intense motion, and the process proceeds to step 4; and if not, the processor determines that the human body is in a state of non-intense motion and the process proceeds to step 5; here, "if not" may refer to all other cases except that "if the acceleration data of at least one axis in the three-axis acceleration data reaches the first acceleration threshold=65". For example, the acceleration data of any of the axes in the three-axis acceleration data does not reach the first acceleration threshold.

In step 4: the processor stores a sampling frequency F=32, a first time period threshold $T_1/F=6/32$ and a first amplitude threshold W0, and the processor counts a time period T and an amplitude W of acceleration data of each of the three axes continuously rising or falling; if the time period of acceleration data of any of the three axes continuously rising or falling reaches the first time period threshold $T_1/F=6/32$ stored in the processor, and if the amplitude of acceleration data of the concerned axis continuously rising or falling reaches the first amplitude threshold stored in the processor, the processor determines that a hand raising identifier appears, and the process proceeds to step 4.1; and if not, step 4 is repeated; here, "if not" may refer to all other cases except that "if the time period of acceleration data of any of the three axes continuously rising or falling reaches the first time period threshold $T_1/F=6/32$ stored in the processor, and if the amplitude of acceleration data of the concerned axis continuously rising or falling reaches the first amplitude threshold stored in the processor"; for example, the time period of acceleration data of each of the three axes continuously rising or falling does not reach the first time period threshold $T_1/F=6/32$ stored in the processor, or the amplitude of acceleration data of each of the axes continuously rising or falling reaches the first amplitude threshold stored in the processor; in the process of implementing this step, the first amplitude threshold may comprise an X-axis first amplitude threshold=58, a Y-axis first amplitude threshold=60 and a Z-axis first amplitude threshold=60, the processor counts a time period and an amplitude of acceleration data of each of the three axes continuously rising or falling; if the time period of acceleration data of any of the three axes continuously rising or falling reaches the first time period threshold $T_1/F=6/32$ stored in the processor, and if the amplitude of acceleration data of the concerned axis continuously rising or falling reaches the first amplitude threshold of the corresponding axis stored in the processor, the processor determines that the hand raising identifier appears, and the process proceeds to step 4.1; and if not, step 4 is repeated.

In step 4.1: the processor stores a second time period threshold $T_2/F=12/32$, a first acceleration interval [A1, B1], and a first number threshold NO; within the second time period threshold $T_2/F=12/32$, the processor samples $T_2=12$ acceleration data for each of the axes and counts a number value N of acceleration data of each of the axes falling within the first acceleration interval; if the number value of each of the axes reaches the first number threshold, the processor determines that the hand is raised, and the process proceeds to step 6; if the number value of any of the axes does not reach the first number threshold, step 4 is repeated; in the process of implementing this step, the first acceleration interval may comprise an X-axis first acceleration interval $[a_1, b_1]=[-30, 35]$, a Y-axis first acceleration interval $[a_2, b_2]=[-80, 15]$ and a Z-axis first acceleration interval $[a_3, b_3]=[-80, -10]$, the first number threshold may comprise an X-axis first number threshold=9, a Y-axis first number threshold=10, and a Z-axis first number threshold=9; within the second time period threshold $T_2/F=12/32$, the processor samples $T_2=12$ acceleration data for each of the axes and counts a number value of acceleration data of each of the axes falling within the first acceleration interval of the corresponding axis; if the number value of acceleration data of each of the axes falling within the first acceleration interval of the corresponding axis reaches the first number threshold of the corresponding axis, the processor determines that the hand is raised, and the process proceeds to step 6; if the number value of acceleration data of any of the axes falling within the first acceleration interval of the corresponding axis does not reach the first number threshold of the corresponding axis, step 4 is repeated.

In step 5: the processor stores a sampling frequency F=32, a third time period threshold $T_3/F=7/32$ and a second amplitude threshold, and the processor counts time periods t and amplitudes w of acceleration data of the X-axis and the Y-axis of the three axes continuously rising or falling; if time periods of acceleration data of the X-axis and the Y-axis continuously rising or falling reach the third time period threshold $T_3/F=7/32$, and if amplitudes of acceleration data of the X-axis and the Y-axis continuously rising or falling reach the second amplitude threshold stored in the processor, the processor determines that the hand raising identifier appears, and the process proceeds to step 5.1; and if not, step 5 is repeated; here, "if not" may refer to all other cases except that "if time periods of acceleration data of the X-axis and the Y-axis continuously rising or falling reach the third time period threshold $T_3/F=7/32$, and if amplitudes of acceleration data of the X-axis and the Y-axis continuously rising or falling reach the second amplitude threshold stored in the processor"; for example, time periods of acceleration data of the X-axis and the Y-axis continuously rising or falling do not reach the third time period threshold $T_3/F=7/32$, and amplitudes of acceleration data of the X-axis and the Y-axis continuously rising or falling do not reach the second amplitude threshold stored in the processor; in the process of implementing this step, the second amplitude threshold may comprise an X-axis second amplitude threshold=20, a Y-axis second amplitude threshold=15 and a Z-axis second amplitude threshold=18, the processor counts time periods and amplitudes of acceleration data of the X-axis and the Y-axis of the three axes continuously rising or falling; if time periods of acceleration data of the X-axis and the Y-axis continuously rising or falling reach the third time period threshold $T_3/F=7/32$, and if amplitudes of acceleration data of the X-axis and the Y-axis continuously rising or falling reach the corresponding X-axis second amplitude threshold=20 and Y-axis second amplitude threshold=15 stored in the processor, the processor determines that the hand raising identifier appears, and the process proceeds to step 5.1; and if not, step 5 is repeated.

In step 5.1: the processor stores a second time period threshold $T_2/F=12/32$, a second acceleration interval [A2, B2], and a second number threshold n0; within the second time period threshold $T_2/F=12/32$, the processor samples $T_2=12$ acceleration data for each of the axes and counts a number value n of acceleration data of each of the axes falling within the second acceleration interval; if the number value of each of the axes reaches the second number threshold, the processor determines that the hand is raised, and the process proceeds to step 6; if the number value of any of the axes does not reach the second number threshold, step 5 is repeated; in the process of implementing this step, the second acceleration interval may comprise an X-axis second acceleration interval $[a_4, b_4]=[-30, 36]$, a Y-axis second acceleration interval $[a_5, b_5]=[-80, 17]$ and a Z-axis second acceleration interval $[a_6, b_6]=[-70, -8]$, the first number threshold may comprise an X-axis second number threshold=10, a Y-axis second number threshold=9, and a Z-axis second number threshold=9; within the second time period threshold $T_2/F=12/32$, the processor samples $T_2=12$ acceleration data for each of the axes and counts a number value of acceleration data of each of the axes falling within the second acceleration interval of the corresponding axis; if the number value of acceleration data of each of the axes falling within the second acceleration interval of the corresponding axis reaches the second number threshold of the corresponding axis, the processor determines that the hand is raised, and the process proceeds to step 6; if the number value of acceleration data of any of the axes falling within the second acceleration interval of the corresponding axis does not reach the second number threshold of the corresponding axis, step 5 is repeated.

In step 6: the processor controls the lighting of the display screen.

A smart wristband for implementing the above method for lighting a screen of a smart wristband by raising the hand is also disclosed. The smart wristband comprises at least a processor, a display screen and a three-axis acceleration sensor; the processor comprises a storage module and a comparison module; the processor is connected to the display screen and the three-axis acceleration sensor, and the comparison module implements the comparison calculation related to the "reach".

According to the above technical solutions of the present invention, the real thought of a user can be accurately determined, a screen is accurately lighted when the user raises the hand, and the state of a wristband worn on the left hand or the right hand does not need to be reset when the user changes the left hand and the right hand.

Finally, it should be noted that the above embodiments are only used to illustrate the technical solutions of the present invention, and are not limited thereto. Although the present invention has been described in detail with reference to the foregoing embodiments, those skilled in the art should understand that the technical solutions described in the foregoing embodiments may be still modified or that some or all of the technical features thereof may be equivalently substituted, while theses modifications and substitutions are not intended to deviate the essence of the corresponding technical solutions from the scope of the technical solutions of the embodiments of the present invention.

What is claimed is:

1. A method for lighting a screen of a smart wristband by raising the hand, the smart wristband comprising at least a processor, a display screen, and a three-axis acceleration sensor, wherein the method comprises the following steps:

step 1: the three-axis acceleration sensor acquires three-axis acceleration data of the smart wristband, and transmits the three-axis acceleration data to the processor;

step 2: the processor filters the acquired three-axis acceleration data to obtain processed three-axis acceleration data;

step 3: the processor stores a sampling frequency F, a first time period threshold $T_1/F$ and an amplitude threshold, and the processor counts a time period and an amplitude of acceleration data of each of the three axes continuously rising or falling; if time periods of acceleration data of an X-axis and a Y-axis of the three axes continuously rising or falling reach the first time period threshold $T_1/F$ stored in the processor, and if amplitudes of acceleration data of the X-axis and the Y-axis continuously rising or falling reach the amplitude threshold stored in the processor, the processor determines that a hand raising identifier appears, and the process proceeds to step 4; and if not, step 3 is repeated;

step 4: the processor stores a second time period threshold $T_2/F$, an acceleration interval, and a number threshold; within the second time period threshold $T_2/F$, the processor samples $T_2$ acceleration data for each of the axes and counts a number value of acceleration data of each of the axes falling within the acceleration interval; if the number value of each of the axes reaches the number threshold, the processor determines that the hand is raised, and the process proceeds to step 5; if the number value of any of the axes does not reach the number threshold, step 3 is repeated; and step 5: the processor controls the lighting of the display screen.

2. The method for lighting a screen of a smart wristband by raising the hand according to claim 1, wherein in the step 3, the amplitude threshold comprises an X-axis amplitude threshold and a Y-axis amplitude threshold, and the processor counts a time period and an amplitude of acceleration data of each of the three axes continuously rising or falling; if time periods of acceleration data of the X-axis and the Y-axis of the three axes continuously rising or falling reach the first time period threshold $T_1/F$ stored in the processor, and if amplitudes of acceleration data of the X-axis and the Y-axis continuously rising or falling reach the amplitude threshold of the corresponding axis stored in the processor, the processor determines that the hand raising identifier appears, and the process proceeds to step 4; and if not, step 3 is repeated.

3. The method for lighting a screen of a smart wristband by raising the hand according to claim 1, wherein in the step 4, the acceleration interval comprises an X-axis acceleration interval $[a_1,b_1]$, a Y-axis acceleration interval $[a_2,b_2]$ and a Z-axis acceleration interval $[a_3,b_3]$, the number threshold comprises an X-axis number threshold, a Y-axis number threshold, and a Z-axis number threshold; within the second time period threshold $T_2/F$, the processor samples $T_2$ acceleration data for each of the axes and counts a number value of acceleration data of each of the axes falling within the acceleration interval of the corresponding axis; if the number value of acceleration data of each of the axes falling within the acceleration interval of the corresponding axis reaches the number threshold of the corresponding axis, the processor determines that the hand is raised, and the process proceeds to step 6; if the number value of acceleration data of any of the axes falling within the acceleration interval of the corresponding axis does not reach the number threshold of the corresponding axis, step 3 is repeated.

4. The method for lighting a screen of a smart wristband by raising the hand according to claim 1, wherein in the step 4, the $T_2$ acceleration data sampled for each of the axes represents an average sample within the second time period threshold $T_2/F$.

5. A method for lighting a screen of a smart wristband by raising the hand, the smart wristband comprising at least a processor, a display screen, and a three-axis acceleration sensor, wherein the method comprises the following steps:
 step 1: the three-axis acceleration sensor acquires three-axis acceleration data of the smart wristband, and transmits the three-axis acceleration data to the processor;
 step 2: the processor filters the acquired three-axis acceleration data to obtain processed three-axis acceleration data;
 step 3: the processor stores a first acceleration threshold; if the acceleration data of at least one axis in the three-axis acceleration data reaches the first acceleration threshold, the processor determines that the human body is in a state of intense motion, and the process proceeds to step 4; and if not, the processor determines that the human body is in a state of non-intense motion and the process proceeds to step 5;
 step 4: the processor stores a sampling frequency F, a first time period threshold $T_1/F$ and a first amplitude threshold, where $T_1$ is an integer, $T_1<F$, and the processor counts a time period and an amplitude of acceleration data of each of the three axes continuously rising or falling; if time period of acceleration data of any of the three axes continuously rising or falling reaches the first time period threshold $T_1/F$ stored in the processor, and if amplitude of acceleration data of the concerned axis continuously rising or falling reaches the first amplitude threshold stored in the processor, the processor determines that a hand raising identifier appears, and the process proceeds to step 4.1; and if not, step 4 is repeated;
 step 4.1: the processor stores a second time period threshold $T_2/F$, a first acceleration interval, and a first number threshold; within the second time period threshold $T_2/F$, where $T_2$ is an integer, $T_2<F$, the processor samples $T_2$ acceleration data for each of the axes and counts a number value of acceleration data of each of the axes falling within the first acceleration interval; if the number value of each of the axes reaches the first number threshold, the processor determines that the hand is raised, and the process proceeds to step 6; if the number value of any of the axes does not reach the first number threshold, step 4 is repeated; and
 step 5: the processor stores a sampling frequency F, a third time period threshold $T_3/F$ and a second amplitude threshold, where $T_3$ is an integer, $T_3<F$, and the processor counts time periods and amplitudes of acceleration data of the X-axis and the Y-axis of the three axes continuously rising or falling; if time periods of acceleration data of the X-axis and the Y-axis continuously rising or falling reach the third time period threshold $T_3/F$, and if amplitudes of acceleration data of the X-axis and the Y-axis continuously rising or falling reach the second amplitude threshold stored in the processor, the processor determines that the hand raising identifier appears, and the process proceeds to step 5.1; and if not, step 5 is repeated;
 step 5.1: the processor stores a second acceleration interval, and a second number threshold; within the second time period threshold $T_2/F$, the processor samples $T_2$ acceleration data for each of the axes and counts a number value of acceleration data of each of the axes falling within the second acceleration interval; if the number value of each of the axes reaches the second number threshold, the processor determines that the hand is raised, and the process proceeds to step 6; if the number value of any of the axes does not reach the second number threshold, step 5 is repeated; and
 step 6: the processor controls the lighting of the display screen.

6. The method for lighting a screen of a smart wristband by raising the hand according to claim 5, wherein in the step 4, the first amplitude threshold comprises an X-axis first amplitude threshold, a Y-axis first amplitude threshold and a Z-axis first amplitude threshold, the processor counts a time period and an amplitude of acceleration data of each of the three axes continuously rising or falling; if the time period of acceleration data of any of the three axes continuously rising or falling reaches the first time period threshold $T_1/F$ stored in the processor, and if the amplitude of acceleration data of the concerned axis continuously rising or falling reaches the first amplitude threshold of the corresponding axis stored in the processor, the processor determines that the hand raising identifier appears, and the process proceeds to step 4.1; and if not, step 4 is repeated.

7. The method for lighting a screen of a smart wristband by raising the hand according to claim 5, wherein in the step 4.1, the first acceleration interval comprises an X-axis first acceleration interval $[a_1, b_1]$, a Y-axis first acceleration interval $[a_2, b_2]$ and a Z-axis first acceleration interval $[a_3, b_3]$, the first number threshold comprises an X-axis first number threshold, a Y-axis first number threshold, and a Z-axis first number threshold; within the second time period threshold $T_2/F$, the processor samples $T_2$ acceleration data for each of the axes and counts a number value of acceleration data of each of the axes falling within the first acceleration interval of the corresponding axis; if the number value of acceleration data of each of the axes falling within the first acceleration interval of the corresponding axis reaches the first number threshold of the corresponding axis, the processor determines that the hand is raised, and the process proceeds to step 6; if the number value of acceleration data of any of the axes falling within the first acceleration interval of the corresponding axis does not reach the first number threshold of the corresponding axis, step 4 is repeated.

8. The method for lighting a screen of a smart wristband by raising the hand according to claim 5, wherein in the step 5, the second amplitude threshold comprises an X-axis second amplitude threshold, a Y-axis second amplitude threshold and a Z-axis second amplitude threshold, the processor counts time periods and amplitudes of acceleration data of the X-axis and the Y-axis of the three axes continuously rising or falling; if time periods of acceleration data of the X-axis and the Y-axis continuously rising or falling reach the third time period threshold $T_3/F$, and if amplitudes of acceleration data of the X-axis and the Y-axis continuously rising or falling reach the corresponding X-axis second amplitude threshold and Y-axis second amplitude threshold stored in the processor, the processor determines that the hand raising identifier appears, and the process proceeds to step 5.1; and if not, step 5 is repeated.

9. The method for lighting a screen of a smart wristband by raising the hand according to claim 6, wherein in the step 5.1, the second acceleration interval comprises an X-axis second acceleration interval $[a_4, b_4]$, a Y-axis second acceleration interval $[a_5, b_5]$ and a Z-axis second acceleration interval $[a_6, b_6]$, the second number threshold comprises an X-axis second number threshold, a Y-axis second number threshold, and a Z-axis second number threshold; within the second time period threshold $T_2/F$, the processor samples $T_2$ acceleration data for each of the axes and counts a number value of acceleration data of each of the axes falling within the second acceleration interval of the corresponding axis; if the number value of acceleration data of each of the axes falling within the second acceleration interval of the corresponding axis reaches the second number threshold of the corresponding axis, the processor determines that the hand is raised, and the process proceeds to step 6; if the number value of acceleration data of any of the axes falling within the second acceleration interval of the corresponding axis does not reach the second number threshold of the corresponding axis, step 5 is repeated.

10. The method for lighting a screen of a smart wristband by raising the hand according to any one of claim 2, wherein in the step 4, the $T_2$ acceleration data sampled for each of the axes represents an average sample within the second time period threshold $T_2/F$.

11. The method for lighting a screen of a smart wristband by raising the hand according to any one of claim 3, wherein in the step 4, the $T_2$ acceleration data sampled for each of the axes represents an average sample within the second time period threshold $T_2/F$.

* * * * *